(12) United States Patent
Zheng et al.

(10) Patent No.: US 8,320,773 B2
(45) Date of Patent: Nov. 27, 2012

(54) REDUCING CROSS-MODULATION IN MULTICHANNEL MODULATED OPTICAL SYSTEMS

(75) Inventors: Jun Zheng, Houston, TX (US); Chao-Hung Tsai, Ningbo (CN)

(73) Assignee: Applied Optoelectronics, Inc., Sugar Land, TX (US)

( * ) Notice: Subject to any disclaimer, the term of this patent is extended or adjusted under 35 U.S.C. 154(b) by 959 days.

(21) Appl. No.: 12/245,028

(22) Filed: Oct. 3, 2008

(65) Prior Publication Data

US 2010/0086309 A1 Apr. 8, 2010

(51) Int. Cl.
*H04B 10/00* (2006.01)
(52) U.S. Cl. ........................................................ 398/194
(58) Field of Classification Search ........... 398/193–194
See application file for complete search history.

(56) References Cited

U.S. PATENT DOCUMENTS

| | | | |
|---|---|---|---|
| 5,703,530 A | 12/1997 | Sato et al. | |
| 6,118,479 A | 9/2000 | Maeda et al. | |
| 6,549,316 B2 | 4/2003 | Blauvelt | |
| 6,577,177 B2 | 6/2003 | Zhou et al. | |
| 6,728,277 B1 * | 4/2004 | Wilson | 372/38.1 |
| 7,873,285 B2 * | 1/2011 | Zhou et al. | 398/192 |

FOREIGN PATENT DOCUMENTS

WO 0014887 3/2000

* cited by examiner

*Primary Examiner* — Shi K Li
(74) *Attorney, Agent, or Firm* — Grossman Tucker Perreault & Pfleger, PLLC; Norman S. Kinsella (57) ABSTRACT

A modulated optical system with cross-modulation compensation reduces or corrects cross-modulation that might occur at a target frequency range in a multichannel RF signal that modulates a laser. The system detects the cross-modulation, for example, by detecting an envelope of the RF signal or by detecting RF power fluctuations, generates a cross-modulation detection signal, filters the cross-modulation detection signal at the target frequency range, and imparts a compensating cross-modulation to the RF signal in response to the filtered cross-modulation detection signal.

23 Claims, 7 Drawing Sheets

REDUCING CROSS-MODULATION IN MULTICHANNEL MODULATED OPTICAL SYSTEMS

CROSS-REFERENCE TO RELATED APPLICATIONS

The present application relates to U.S. patent application Ser. No. 12/245,008 filed concurrently herewith, which is fully incorporated herein by reference.

TECHNICAL FIELD

The present disclosure relates to modulated optical systems and more particularly, to a system and method for reducing cross-modulation in multichannel modulated optical systems.

BACKGROUND INFORMATION

In a communications system where multiple channels are transmitted, such as a CATV system, multiple analog signals corresponding to the multiple channels may be combined into a wide-band multichannel RF signal, which drives a laser to produce a multichannel modulated optical signal. The multiple analog signals may include multiple modulated analog carriers that may be combined, for example, using frequency division multiplexing techniques. One or more digital signals modulated using digital modulation, such as quadrature amplitude modulated (QAM), may also be combined with the modulated analog carrier signals, for example, using subcarrier multiplexing (SCM) techniques. In some systems, for example, as many as 110 channels may be transmitted over a frequency range of about 50 MHz to 750 MHz.

Cross-modulation occurs when the nonlinearities of a system result in a carrier in a multi-carrier system (i.e., a multichannel RF signal) being modulated by the various signals carried on other channels in the same system. In a CATV system, for example, a group of video carriers may modulate other video carriers in a multichannel video system. Because each video channel contains a constant, high-level signal component at the horizontal line frequency (about 15.75 kHz in the NTSC system), this may be the most noticeable component of cross-modulation. One source of cross-modulation may be RF amplifiers in which gain compression produces less gain at higher RF signal power than at lower RF signal power. Another source of cross-modulation may be changes in bias current to reduce or prevent clipping in the laser, for example, as described in greater detail in U.S. patent application Ser. No. 12/053,104 filed Mar. 21, 2008, which is commonly owned and fully incorporated herein by reference.

BRIEF DESCRIPTION OF THE DRAWINGS

These and other features and advantages will be better understood by reading the following detailed description, taken together with the drawings wherein.

DETAILED DESCRIPTION

Figure 1:
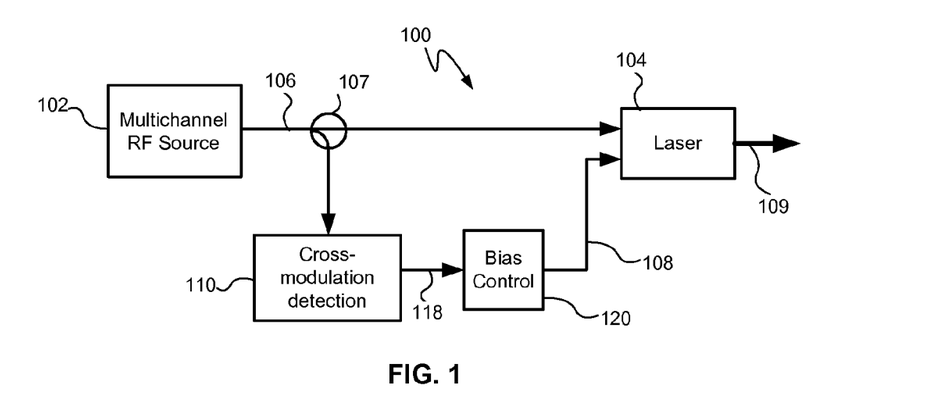
FIG. 1 is a functional block diagram of a multichannel modulated optical system with cross-modulation compensation, consistent with embodiments of the present disclosure.

Referring to FIG. 1, a modulated optical system 100 with cross-modulation compensation, consistent with embodiments described herein, is capable of reducing cross-modulation by varying bias current in response to cross-modulation detected on a multichannel RF signal. The modulated optical system 100 generally includes a laser 104 that receives a multichannel RF signal 106 from a multichannel RF source 102. The laser 104 may include a RF input that receives the multichannel RF signal 106, a bias current input that receives a bias current 108, and an optical output that produces a modulated optical signal 109 in response to the RF signal 106 and the bias current 108. The system 100 may also include other circuitry and/or components (not shown) between the multichannel RF source 102 and the laser 104 such as, for example, one or more predistortion circuits and a laser driver circuit. In one example, the modulated optical system 100 may be an optical transmitter such as a CATV transmitter.

By varying the bias current 108 in response to cross-modulation detected on the multichannel RF signal 106, the system 100 may impart compensating cross-modulation with a magnitude substantially equal to the magnitude of the detected cross-modulation and with a phase that is substantially opposite the phase of the detected cross-modulation, thereby compensating for the detected cross-modulation. As used herein, "compensate," "compensation" or "compensating" for cross-modulation means reducing detected cross-modulation to a point that is tolerable in a particular system and does not necessarily require elimination of cross-modulation.

The system 100 includes cross-modulation detection circuitry 110 that detects cross-modulation in the multichannel RF signal 106 from the multichannel RF source 102 and bias control circuitry 120 that controls the bias current 108 provided to the laser 104. The cross-modulation detection circuitry 110 may be coupled to the RF signal path, for example, using a splitter 107, such that the RF signal 106 is provided to the cross-modulation detection circuitry 110 and to the laser 104. The cross-modulation detection circuitry 110 produces a cross-modulation detection signal 118 representing at least a portion of the cross-modulation on the multichannel RF signal 106.

The bias control circuitry 120 varies the bias current 108 in response to the cross-modulation detection signal 118, which imparts compensating cross-modulation on the RF signal 106 provided to the laser 104. In other words, the cross-modulation detection signal 118 may be used to modulate the bias current. Modulation of the bias current by the cross-modulation detection signal 118 causes fluctuations in the bias current, which cause the RF signal 106 to be modulated with compensating cross-modulation. The bias control circuitry 120 may vary the bias current, for example, such that the bias current changes in an opposite direction of the detected cross-modulation on the RF signal to impart the compensating cross-modulation that cancels out the detected cross-modulation.

The multichannel RF signal 106 may include multiple superimposed modulated analog carriers at different frequencies. The multiple modulated analog carriers may be modulated using modulation techniques known to those skilled in the art, such as amplitude modulation, and may be combined using multiplexing techniques known to those skilled in the art, such as frequency division multiplexing. The multichannel RF signal 106 may also include one or more digital signals modulated using digital modulation, such as quadrature amplitude modulation (QAM). The resulting multichannel RF signal 106 occupies a bandwidth across the range of frequencies of the multiple modulated carriers. Those skilled in the art will recognize that various modulation and multiplexing techniques may be used to generate the multichannel RF signal 106.

In one embodiment, the multichannel RF source 102 may include headend equipment in a CATV system and the multichannel RF signal 106 may be a downstream CATV signal. Examples of downstream multichannel CATV signals include 77 channels transmitted over a frequency range of about 50 MHz to 550 MHz and 110 channels transmitted over a frequency range of about 50 MHz to 750 MHz. Each channel in a downstream multichannel CATV signal may include a video carrier, a color subcarrier and an audio carrier. Other types of signals and frequency ranges may also be transmitted.

Cross-modulation can occur when nonlinearities result in a carrier or channel in the multichannel RF signal 106 being modulated by the various signals carried on other channels in the same system. In a CATV system, for example, a group of video carriers may modulate other video carriers. Because each video channel contains a constant, high-level signal component at the horizontal line frequency (about 15.75 kHz in the NTSC system), this may be the most noticeable component of cross-modulation.

In the exemplary embodiment, the multichannel RF signal 106, which occupies a bandwidth across the range of frequencies of the multiple modulated carriers, directly modulates the laser 104. Each channel in the multichannel RF signal 106 may be driven or modulated up to a certain optical modulation index (OMI) depending upon a desired channel-to-noise ratio (CNR). In one embodiment, the OMI of at least some of the channels may be at least about 4% and more specifically about 5%.

Figure 2A:
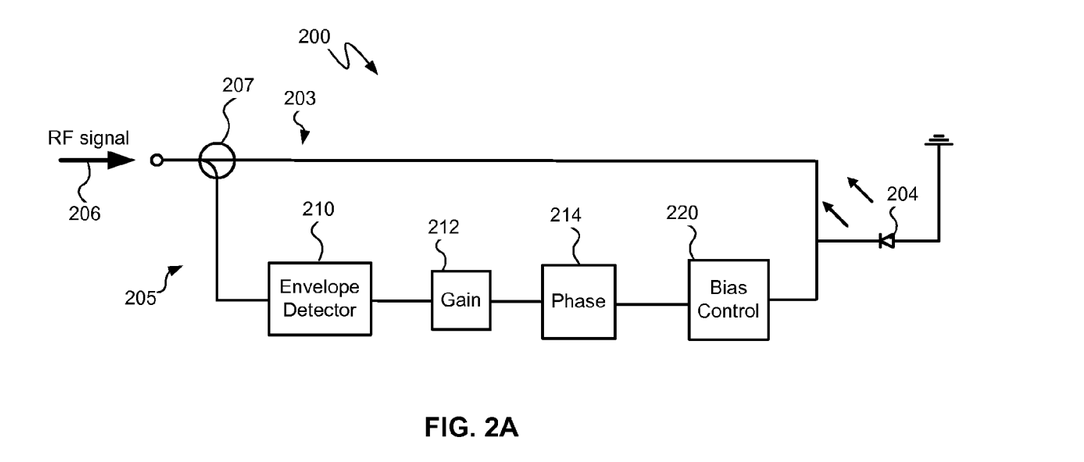
FIGS. 2A and 2B are functional block diagrams of multichannel modulated optical systems with cross-modulation compensation, consistent with other embodiments of the present disclosure.
Figure 2B:
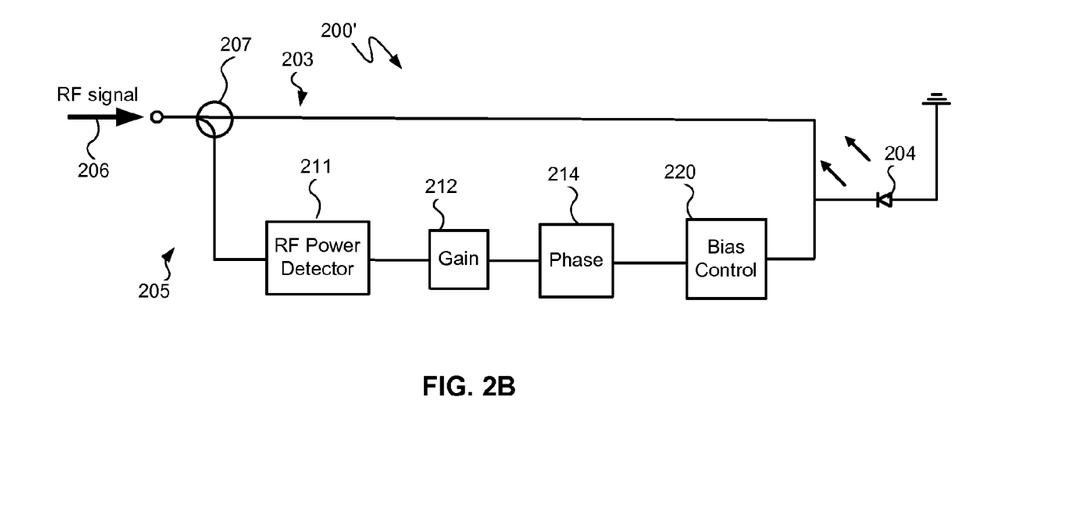

Referring to FIGS. 2A and 2B, modulated optical systems 200, 200' with cross-modulation compensation are described in greater detail. The system 200 generally includes a primary signal path 203 for carrying a multichannel RF signal 206 to a laser 204 and a secondary signal path 205 for providing the cross-modulation compensation. The secondary signal path 205 may be coupled to the primary signal path 203, for example, using a splitter 207. In the embodiment shown in FIG. 2A, the system 200 includes envelope follower or detector circuitry 210 to detect cross-modulation on the RF signal 206. The envelope follower or detector circuitry 210 receives the multichannel RF signal on the secondary signal path 205 and generates a cross-modulation detection signal that follows an envelope of the multichannel RF signal 206. The changes in the envelope of the RF signal 206 may be indicative or representative of cross-modulation on the RF signal 206.

The envelope follower or detector circuitry 210 may include circuitry known to those skilled in the art for detecting an envelope of a high frequency RF signal. In particular, the envelope follower or detector circuitry 210 may include envelope detection circuitry that has a response time fast enough to detect an envelope of a multichannel RF signal. Envelope follower or detector circuitry 210 may be implemented using known envelope detection circuitry such as, for example, a precision rectifier circuit and a low pass filter. Specific implementations of envelope detection circuitry capable of detecting the envelope of such a signal are shown and described in U.S. patent application Ser. No. 12/053,104 and in U.S. patent application Ser. No. 11/753,082, which are fully incorporated herein by reference.

The system 200 may also include one or more gain control elements 212, such as a variable gain element and/or a variable attenuator, to provide gain and/or loss and thus controllably vary a magnitude of the cross-modulation detection signal generated by the envelope detection circuitry 210. The gain control element(s) 212 may provide gain or loss depending upon how much compensating cross-modulation is needed to compensate for the detected cross-modulation. In other words, the gain control element(s) 212 may be used to provide gain or loss such that the magnitude of the compensating cross-modulation imparted to the RF signal corresponds sufficiently to the magnitude of the cross-modulation being compensated.

Figure 10:
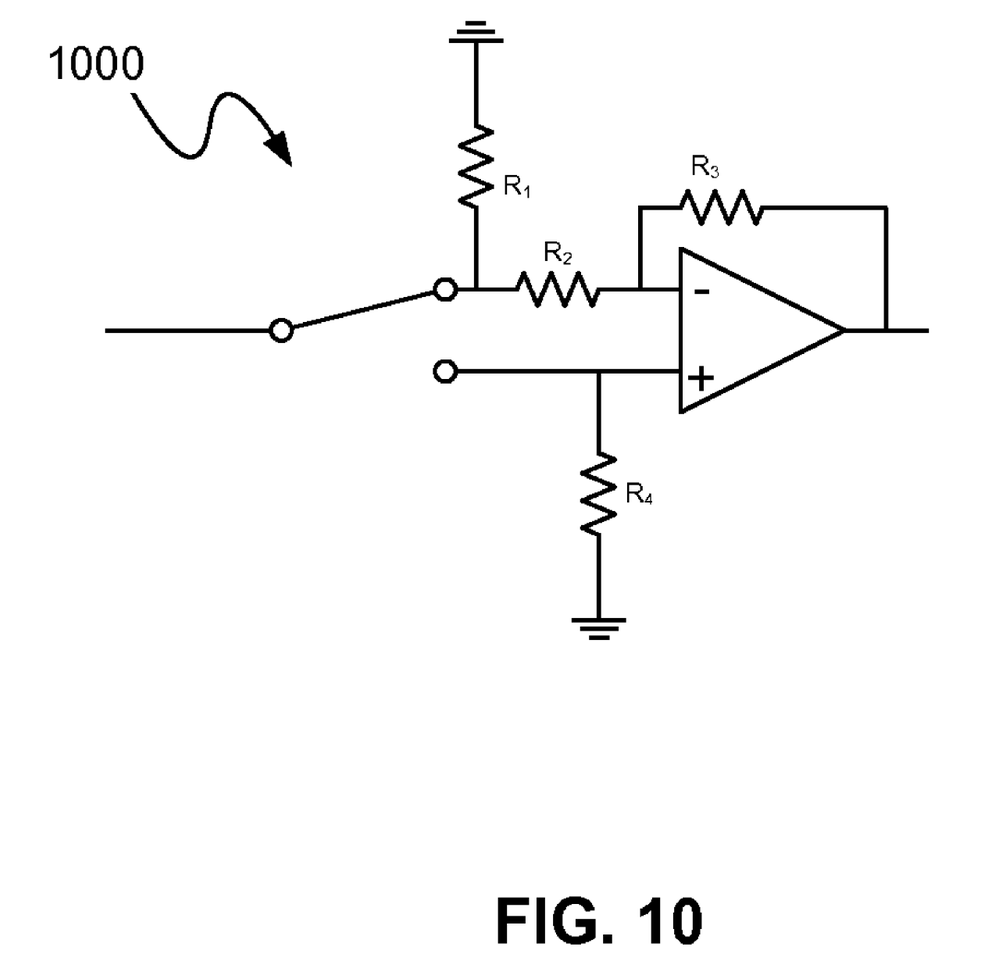
FIG. 10 is a schematic diagram of one embodiment of a phase control element that may be used in a multichannel modulated optical system with cross-modulation compensation.

The system 200 may further include one or more phase control elements 214, such as a phase switch, to control a phase of the cross-modulation detection signal generated by the envelope detection circuitry 210. The phase control element(s) 214 may change the phase as needed (e.g., by switching between positive and negative) to ensure that the phase of the compensating cross-modulation imparted to the RF signal is sufficiently out of phase with respect to the cross-modulation being compensated. One example of a phase switch may be implemented using an inverted amplifier circuit 1000, as shown in FIG. 10, which is generally known to those skilled in the art. Although the phase control element 214 is shown following the gain control element 212, the phase control element(s) 214 and gain control element(s) 212 may be arranged differently on the secondary signal path 205.

The system 200 further includes bias control circuitry 220 that adjusts or varies a bias current 208 in response to the cross-modulation detection signal that follows the envelope of the RF signal 206 and that has a magnitude and phase sufficient to compensate for the detected cross-modulation. The laser 204 receives both the RF signal on the primary signal path 203 and the varying bias current provided by the bias control circuitry 220 and generates a modulated optical signal in response thereto. When the varying bias current is combined with the RF signal, compensating cross-modulation is imparted on the RF signal 206 to compensate for the detected cross-modulation. The bias control circuitry 220 may also adjust the bias current in response to other signals, such as an anti-clipping signal and/or a power monitor signal. The bias control circuitry 220 may include circuitry know to those of ordinary skill in the art for providing a bias current to a directly modulated laser.

Because of the time required to detect the envelope and to generate the cross-modulation detection signal, a delay may exist between the cross-modulation detection signal on the secondary signal path 205 and the RF signal on the primary signal path 203. As a result of the delay, the varying bias current may lag behind the RF signal. According to one embodiment, the system 200 may also include a delay element (not shown) in the primary signal path 203 such that the RF signal is delayed to reduce or eliminate this lag. The delay element may not be needed, however, when the cross modulation is predominantly the 15.75 kHz signal component because the RF delay is relatively short.

In the embodiment shown in FIG. 2B, the modulated optical system 200' includes an RF power detector 211 to detect the cross-modulation on the RF signal. The RF power detector 211 receives the multichannel RF signal on the secondary signal path 205, detects fluctuations in the RF power, and generates a cross-modulation detection signal that varies with the detected power fluctuations. Similar to the envelope of the RF signal, fluctuations in the RF power may be indicative or representative of cross-modulation on the RF signal. The RF power detector 211 may include circuitry known to those skilled in the art for detecting power fluctuations in a RF signal, such as a 50 MHz to 3 GHz monolithic RF power detector capable of measuring RF signals over a 60 dB dynamic range. One such RF power detector is available from Linear Technology Corporation under the name LT®5534.

In the system 200', the magnitude and/or phase may then be adjusted using gain control element(s) 212 and/or phase control element(s) 214 as described above. The bias control circuitry 220 may then vary the bias current provided to the laser 204 in response to the cross modulation detection signal that varies in response to RF power fluctuations.

Figure 3A:
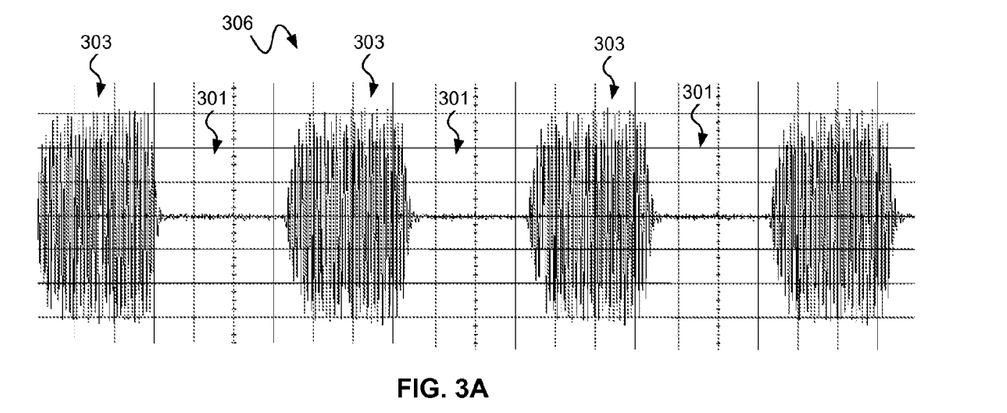
FIG. 3A illustrates an example of a multichannel RF signal with cross-modulation.
Figure 3B:
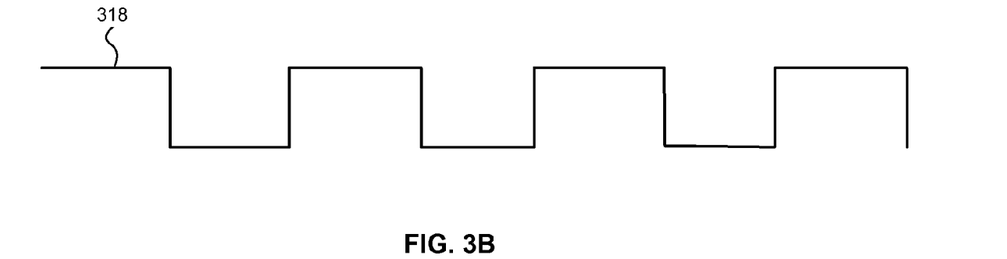
FIG. 3B illustrates a cross-modulation detection signal generated in response to the multichannel RF signal shown in FIG. 3A, consistent with embodiments of the present disclosure.

FIGS. 3A-3D illustrate one example of the generation of a cross-modulation detection signal 318 from a multichannel RF signal 306. FIG. 3A illustrates a multichannel RF signal 306 with cross-modulation. The illustrated RF signal 306 includes periods 301 of lower power and periods 303 of higher power. FIG. 3B illustrates the cross-modulation detection signal 318 generated by cross-modulation detection circuitry, such as an envelope detector or RF power detector. The cross-modulation detection signal 318 generally corresponds to the envelope or power fluctuations of the RF signal 306 and is indicative of the cross-modulation on the RF signal 306.

Figure 3C:
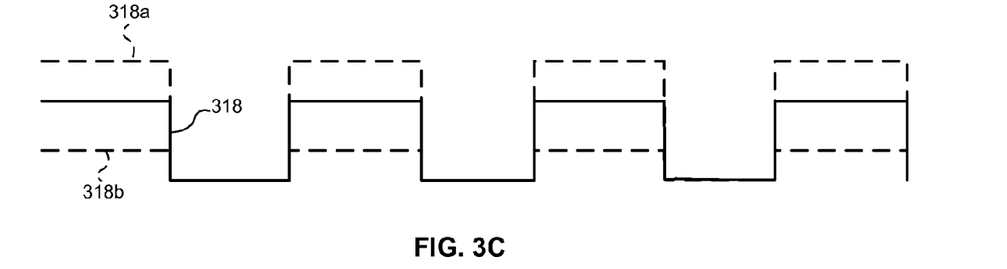
FIG. 3C shows variation of the magnitude of a cross-modulation detection signal, consistent with embodiments of the present disclosure.

FIG. 3C illustrates the cross-modulation detection signal 318 with changes in magnitude that may be provided, for example, by the gain control element(s) 212 shown in FIGS. 2A and 2B. Providing gain results in a cross-modulation detection signal 318a with increased magnitude. Providing loss or attenuation results in a cross-modulation signal 318b with a decreased magnitude. As mentioned above, the magnitude of the cross-modulation detection signal 318 may be adjusted depending upon the cross-modulation to be compensated.

Figure 3D:
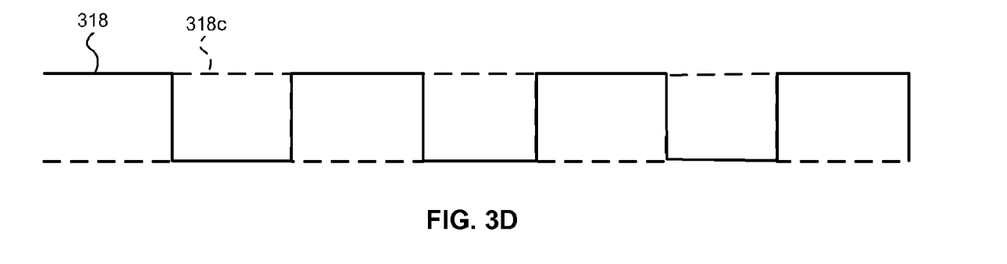
FIG. 3D shows variation of the phase of a cross-modulation detection signal, consistent with embodiments of the present disclosure.

FIG. 3D illustrates the cross-modulation detection signal 318 with changes in phase that may be provided, for example, by the phase control element(s) 214 shown in FIGS. 2A and 2B. Adjusting the phase results in a cross-modulation detection signal 318c with a different phase than the cross-modulation detection signal 318. As mentioned above, the phase of the cross-modulation detection signal 318 may be adjusted depending upon the cross-modulation to be compensated. In an embodiment, the phase may be changed such that the phase-adjusted cross-modulation detection signal 318c is inverted relative to the cross-modulation detection signal 318. In other embodiments, the phase may be kept the same as the cross-modulation detection signal 318.

Figure 4:
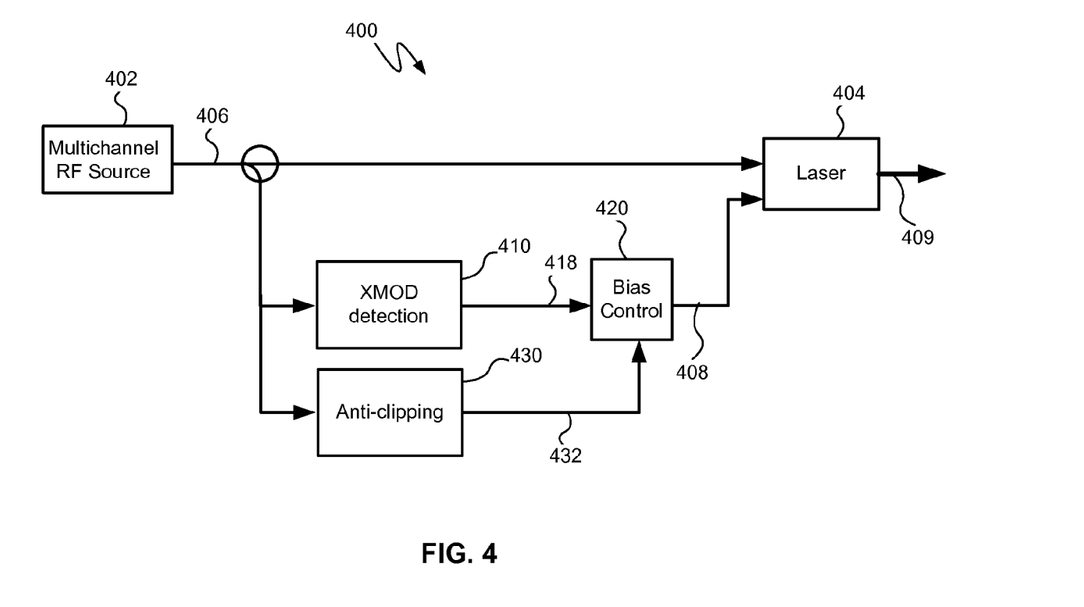
FIG. 4 is a functional block diagram of a multichannel modulated optical system with cross-modulation compensation and anti-clipping, consistent with another embodiment of the present disclosure.

Referring to FIG. 4, a further embodiment of a modulated optical system 400 with cross-modulation compensation may also provide anti-clipping. When multiple modulated carriers of a multichannel RF signal 406 align in phase, the sum of the voltage of the aligned carriers may result in a peak voltage condition. When the optical modulation index (OMI) of each channel exceeds a certain level (e.g., exceeding about 3% OMI per channel), the peak voltage condition may result in a higher occurrence of negative voltage spikes or peaks that cause the laser input current to fall below a threshold current of a laser 404, resulting in clipping.

The system 400 may include cross-modulation detection circuitry 410 that provides cross-modulation detection signal 418, for example, as described above, and anti-clipping circuitry 430 that provides an anti-clipping signal 432. The cross-modulation detection circuitry 410 and the anti-clipping circuitry 430 receive the RF signal 406 from a multichannel RF source 402 and generate the respective cross-modulation detection signal 418 and anti-clipping signal 432 in response thereto. Bias control circuitry 420 may adjust a bias current 408 provided to laser 404 in response to the cross-modulation detection signal 418 and/or the anti-clipping signal 432. When the RF signal modulates the laser 404, the varying bias current 408 may thus cause compensation of cross-modulation, as described above, and/or a reduction of clipping. As used herein, to reduce or correct clipping means to prevent one or more negative spikes or peaks in the multichannel RF signal from causing clipping in the laser 404 and does not require a complete elimination of clipping.

In one embodiment, the anti-clipping circuitry 430 includes envelope follower circuitry that receives the multichannel RF signal 406, detects an envelope of the RF signal 406, and generates the anti-clipping signal 432 in response to the detected envelope. By adjusting the bias current 408 in response to an envelope of the multichannel RF signal, the system 400 reduces or corrects clipping that might occur in the laser 404 as a result of negative spikes or peaks in the multichannel RF signal 406. In one embodiment, the bias current 408 may be adjusted or varied inversely proportional to a detected lower envelope of the multichannel RF signal. In particular, the bias current 408 may be increased as a lower envelope of the multichannel RF signal 406 falls and indicates a peak negative voltage condition. Thus, when the multichannel RF signal 406 falls below the threshold current of the laser as a result of a negative peak, the bias current 408 should be increased to a level that will prevent that negative peak and/or subsequent negative peak(s) from causing clipping. Embodiments of anti-clipping circuitry are described in greater detail in U.S. patent application Ser. No. 12/053,104 and in U.S. patent application Ser. No. 11/753,082, which are fully incorporated herein by reference.

Figure 5:
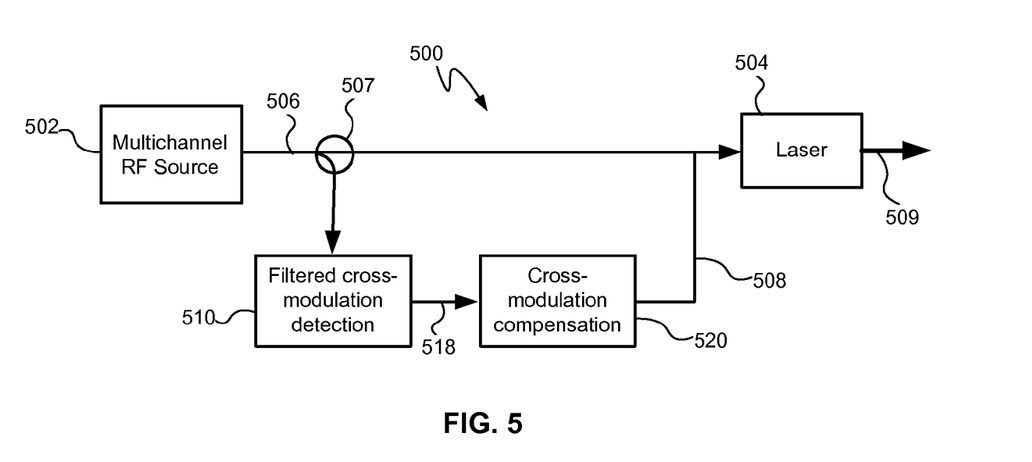
FIG. 5 is a functional block diagram of a multichannel modulated optical system with cross-modulation compensation at a target frequency range, consistent with an embodiment of the present disclosure.

Referring to FIG. 5, another embodiment of a modulated optical system 500 with cross-modulation compensation is capable of compensating cross-modulation at a target frequency range. As used herein, "target frequency range" may include a single frequency or a range of multiple frequencies. As discussed above, for example, a significant component of cross-modulation in a CATV RF signal is at the horizontal line frequency (about 15.75 kHz in the NTSC system). The modulated optical system 500 may thus provide cross-modulation compensation at the horizontal line frequency. Cross-modulation compensation may also be provided at other horizontal line frequencies or other target frequencies.

The modulated optical system 500 generally includes a laser 504 that receives a multichannel RF signal 506 from a multichannel RF source 502. The laser 504 may include a RF input that receives the multichannel RF signal 506, a bias current input that receives a bias current 508, and an optical output that produces a modulated optical signal 509 in response to the RF signal 506 and the bias current 508. The system 500 may also include other circuitry and/or components (not shown) between the multichannel RF source 502 and the laser 504 such as, for example, one or more predistortion circuits and a laser driver circuit. In one example, the modulated optical system 500 may be an optical transmitter such as a CATV transmitter.

The system 500 also includes filtered cross-modulation detection circuitry 510 that detects cross-modulation in the multichannel RF signal 506 from the multichannel RF source 502 and cross-modulation compensation circuitry 520 that imparts compensating cross-modulation to the RF signal 506. The cross-modulation detection circuitry 510 may be coupled to the RF signal path, for example, using a splitter 507, such that the RF signal 506 is provided to the cross-modulation detection circuitry 510 and to the laser 504. The cross-modulation detection circuitry 510 produces a filtered cross-modulation detection signal 518 representing at least a portion of the cross-modulation on the multichannel RF signal 506 at the target frequency range. The cross-modulation compensation circuitry 520 modulates the RF signal 506 provided to the laser 504 in response to the filtered cross-modulation compensation signal 518. The modulation of the RF signal 506 imparts the compensating cross-modulation to compensate for the detected cross-modulation component at the target frequency range.

Figure 6:
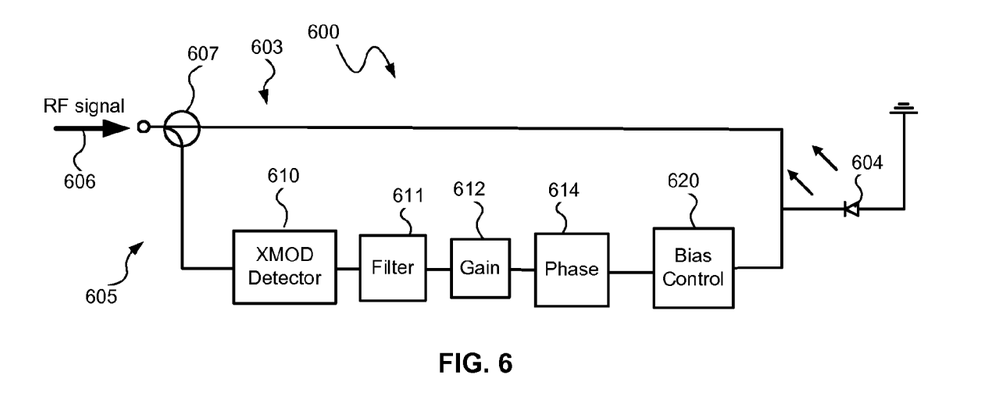
FIG. 6 is a functional block diagram of a multichannel modulated optical system that varies bias current to provide cross-modulation compensation at a target frequency range, consistent with an embodiment of the present disclosure.
Figure 7:
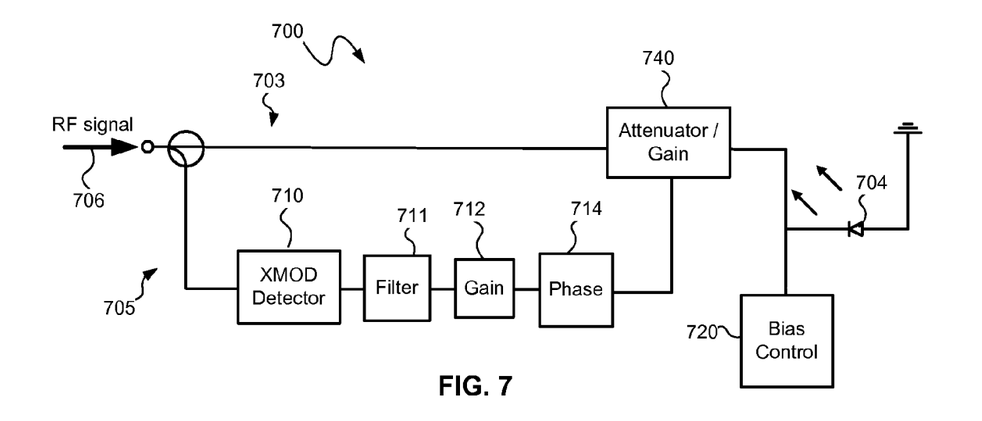
FIG. 7 is a functional block diagram of a multichannel modulated optical system that controls attenuation/gain of the RF signal to provide cross-modulation compensation at a target frequency range, consistent with another embodiment of the present disclosure.
Figure 8:
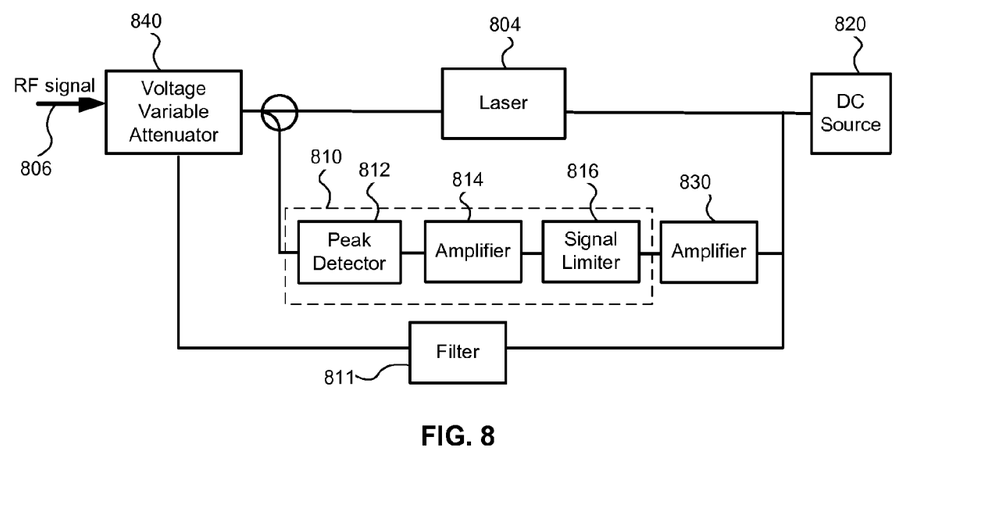
FIG. 8 is a functional block diagram of a multichannel modulated optical system that provides anti-clipping and controls attenuation/gain of the RF signal to provide cross-modulation compensation at a target frequency range, consistent with a further embodiment of the present disclosure.

FIGS. 6-8 illustrate different embodiments of modulated optical systems 600, 700, 800 that provide cross-modulation compensation at a target frequency range. The modulated optical system 600 shown in FIG. 6 compensates for cross-modulation at the target frequency range by adjusting the bias current provided to a laser 604. The system 600 generally includes a primary signal path 603 for carrying a multichannel RF signal 606 to the laser 604 and a secondary signal path 605 for providing the cross-modulation compensation by varying the bias current. The secondary signal path 605 may be coupled to the primary signal path 603, for example, using a splitter 607.

The system 600 includes cross-modulation detection circuitry 610, such as envelope detection circuitry or RF power detection circuitry, to detect the cross-modulation on the RF signal, as described above. The cross-modulation detection circuitry 610 receives the multichannel RF signal 606 on the secondary signal path 605 and generates a cross-modulation detection signal that follows an envelope of the RF signal 606 and/or varies with the detected power fluctuations of the RF signal 606.

The system 600 includes a filter 611 to filter the cross-modulation detection signal generated by the cross-modulation detection circuitry 610 at the target frequency range. In one embodiment, the filter 611 may be a bandpass filter that passes frequencies within the target frequency range. If the target frequency range is the 15.75 kHz horizontal line frequency, for example, a 15.75 kHz bandpass filter may be used. The cross-modulation detection signal generated by the cross-modulation detection circuitry 610 (e.g., by following the envelope of the RF signal or by detecting power fluctuations in the RF signal) may include components at lower and higher frequencies that do not require compensation. The filter 611 may improve the cross-modulation compensation by removing these higher and lower frequencies and passing a frequency or frequencies within the target frequency range. Thus, compensation of cross-modulation is improved by focusing on the target frequency range where cross-modulation may have a greater impact.

The system 600 may also include one or more gain control elements 612 and one or more phase control elements 614, as described above, to control a magnitude and/or phase of the cross-modulation detection signal as needed to ensure that the magnitude and phase are sufficient to impart compensating cross-modulation. The gain control elements 612 and phase control elements 614 may follow the filter 611 such that the gain and phase of the cross-modulation detection signal is controlled at the target frequency range, which improves cross-modulation performance.

The system 600 further includes bias control circuitry 620 that adjusts or varies a bias current to the laser 604 in response to the filtered cross-modulation detection signal that has a magnitude and phase sufficient to compensate for the detected cross-modulation at the target frequency range. The laser 604 receives both the RF signal on the primary signal path 603 and the varying bias current provided by the bias control circuitry 620 and generates a modulated optical signal in response thereto. When the varying bias current is combined with the RF signal, compensating cross-modulation is imparted on the RF signal and compensates for the detected cross-modulation, as described above.

The modulated optical system 700 shown in FIG. 7 compensates for cross-modulation at the target frequency range by directly modulating the RF signal 706 on a primary signal path 703 before the RF signal 706 modulates a laser 704. Similar to the modulated optical system 600 described above, the system 700 includes a secondary signal path 705 with cross-modulation detection circuitry 710, filter 711, gain control element(s) 712, and phase control element(s) 714, which produce the filtered cross-modulation detection signal having the desired magnitude and phase. Instead of using bias current to impart compensating cross-modulation, the system 700 includes a variable gain control element 740 coupled to the primary signal path 703 for varying attenuation and/or gain of the RF signal 706 in response to the filtered cross-modulation detection signal. By varying the attenuation and/or gain of the RF signal 706 in response to the filtered cross-modulation detection signal, compensating cross-modulation is imparted to the RF signal 706 on the primary signal path 703. The system 700 may also include bias control circuitry 720 that separately controls the bias current to the laser 704 (e.g., in response to a monitored power output of the laser 704 or in response to an anti-clipping signal).

The modulated optical system 800 shown in FIG. 8 provides anti-clipping and compensates for cross-modulation at the target frequency range by directly modulating a RF signal 806. To provide anti-clipping, the system 800 may include anti-clipping circuitry 810 that adjusts the bias current provided by a DC source 820 to a laser 804. The anti-clipping circuitry 810 may include a peak detector 812, an amplifier 814, and a signal limiter 816. The peak detector 812 produces an output signal that is proportional to the frequency of occurrence and intensity of peaks in the RF signal 806 that are likely to cause clipping in the laser 804. The amplifier 814 adjusts the amplitude of the output signal from the peak detector 812 to a level suitable for varying the bias current to the laser 804. The signal limiter 816 may limit the maximum positive and negative signal amplitudes to preset levels to counter any negative effects of excessive laser bias. One example of the anti-clipping circuitry 810 is described in greater detail in U.S. Pat. No. 6,549,316, which is fully incorporated herein by reference.

The changes in bias current caused by the anti-clipping circuit 810 may result in cross-modulation on the RF signal 806 modulating the laser 804. As mentioned above, the cross-modulation may have a significant component at a certain frequency or frequencies (e.g., at the 15.75 kHz frequency corresponding to the horizontal line frequency in a NTSC system). To compensate for such cross-modulation, the anti-clipping signal from the anti-clipping circuitry 810 may be fed back to a voltage variable attenuator 840, which modulates the input RF signal 806 to impart a compensating cross-modulation (i.e., substantially equal in magnitude but opposite in phase). The system 800 may include an amplifier 830 that amplifies the anti-clipping signal to a level suitable for input to the voltage variable attenuator 840 and a filter 811, such as a bandpass filter, that filters the anti-clipping signal at the target frequency range (e.g., at 15.75 kHz). Thus, the voltage variable attenuator 840 may provide the compensating cross-modulation only at the target frequency range.

Figure 9A:
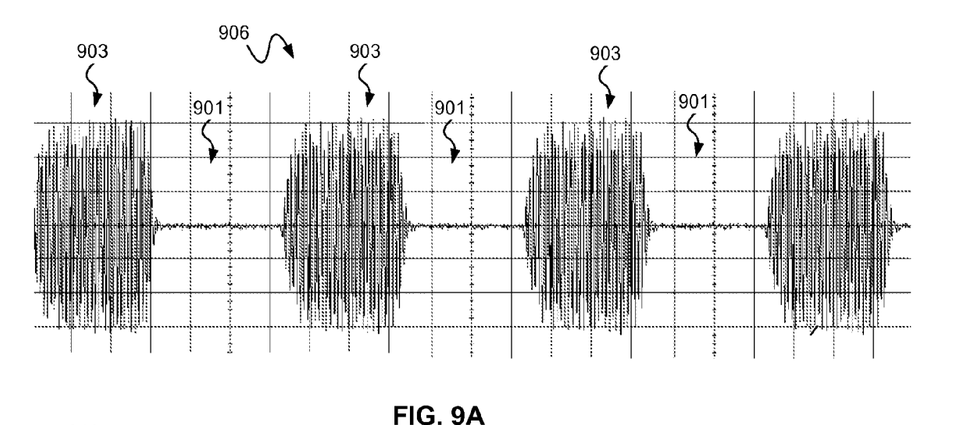
FIG. 9A illustrates an example of a multichannel RF signal with cross-modulation.
Figure 9B:
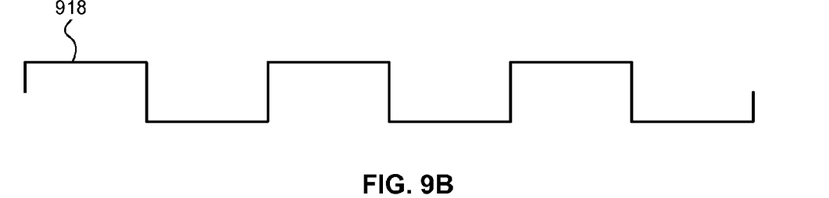
FIG. 9B illustrates a cross-modulation detection signal generated in response to the multichannel RF signal shown in FIG. 9A, consistent with embodiments of the present disclosure.

FIGS. 9A-9E illustrate one example of the generation of a cross-modulation detection signal 918 from a multichannel RF signal 906. FIG. 9A illustrates a multichannel RF signal 906 with cross-modulation. The illustrated RF signal 906 includes periods 901 of lower power and periods 903 of higher power. FIG. 9B illustrates the cross-modulation detection signal 918 generated by cross-modulation detection circuitry, such as an envelope detector or RF power detector. The cross-modulation detection signal 918 generally corresponds to the envelope or power fluctuations of the RF signal 906 and is indicative of the cross-modulation on the RF signal 906.

Figure 9C:
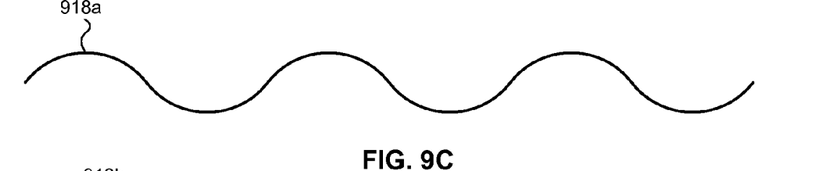
FIG. 9C shows a filtered cross-modulation detection signal at a target frequency range, consistent with embodiments of the present disclosure.
Figure 9D:
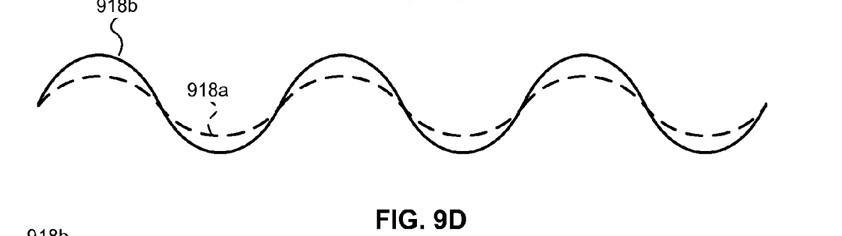
FIG. 9D shows variation of the magnitude of a filtered cross-modulation detection signal, consistent with embodiments of the present disclosure.
Figure 9E:
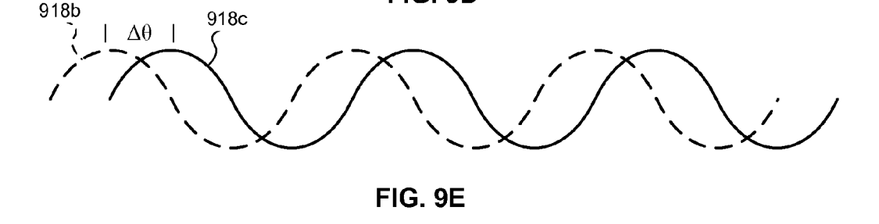
FIG. 9E shows variation of the phase of a filtered cross-modulation detection signal shown, consistent with embodiments of the present disclosure.

FIG. 9C illustrates the filtered cross-modulation detection signal 918a, for example, after the cross-modulation detection signal 918 is filtered by a bandpass filter at the target frequency range. FIG. 9D illustrates the filtered cross-modulation detection signal 918b with an increase in magnitude, for example, after the filtered cross-modulation detection signal 918a is provided with gain. FIG. 9D illustrates the filtered cross-modulation detection signal 918c with a phase change of $\Delta\theta$ relative to the filtered cross-modulation detection signal 918b. The filtered cross-modulation detection signal 918c with the adjusted magnitude and phase may then be used to compensate for cross-modulation at the target frequency range, for example, by varying a bias current or directly modulating the RF signal 906, as described above.

Accordingly, systems and methods, consistent with embodiments of the present disclosure, may compensate for cross-modulation in a multichannel RF signal at a target frequency range.

Consistent with one embodiment, a modulated optical system is provided with cross-modulation compensation. The system includes a laser including a RF input configured to receive a multichannel RF signal, a bias input configured to receive a bias current, and an optical output configured to provide a modulated optical signal in response to the multichannel RF signal and the bias current. The multichannel RF signal includes a superposition of multiple carriers, and at least one of the multiple carriers modulates at least one other of the multiple carriers resulting in cross-modulation. The modulated optical system also includes cross-modulation detection circuitry configured to receive the multichannel RF signal and to generate a cross-modulation detection signal responsive to the multichannel RF signal. The cross-modulation detection circuitry includes a filter configured to filter the cross-modulation detection signal and to generate a filtered cross-modulation detection signal at a target frequency range at which a cross-modulation component occurs. The modulated optical system further includes cross-modulation compensation circuitry configured to modulate the multichannel RF signal provided to the laser in response to the filtered cross-modulation compensation signal such that compensating cross-modulation is imparted to the multichannel RF signal to compensate for the cross-modulation component at the target frequency range.

Consistent with another embodiment, a method is provided for reducing cross-modulation in a modulated optical system. The method includes: providing a multichannel RF signal to a laser diode, the multichannel RF signal including a superposition of multiple carriers, and wherein at least one of the multiple carriers modulates at least one other of the multiple carriers resulting in cross-modulation; receiving a portion of the RF signal on at least one secondary signal path; generating a cross-modulation detection signal responsive to the multichannel RF signal on the secondary signal path; filtering the cross-modulation detection signal to generate a filtered cross-modulation detection signal at a target frequency range at which a cross-modulation component occurs; modulating the multichannel RF signal provided to the laser in response to the filtered cross-modulation detection signal such that compensating cross-modulation is imparted to the multichannel RF signal to compensate for the cross-modulation component at the target frequency range; and providing a modulated optical signal from the laser.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A modulated optical system with cross-modulation compensation, the system comprising:
a laser including a RF input configured to receive a multichannel RF signal, a bias input configured to receive a bias current, and an optical output configured to provide a modulated optical signal in response to the multichannel RF signal and the bias current, the multichannel RF signal including a superposition of multiple carriers, and wherein at least one of the multiple carriers modulates at least one other of the multiple carriers resulting in cross-modulation;

cross-modulation detection circuitry configured to receive the multichannel RF signal and to generate a cross-modulation detection signal responsive to the multichannel RF signal, the cross-modulation detection circuitry comprising a band pass filter configured to filter the cross-modulation detection signal and to generate a filtered cross-modulation detection signal at a target frequency range at which a cross-modulation component occurs; and cross-modulation compensation circuitry configured to modulate the multichannel RF signal provided to the laser in response to the filtered cross-modulation compensation signal such that compensating cross-modulation is imparted to the multichannel RF signal to compensate for the cross-modulation component at the target frequency range.

2. The system of claim 1 wherein the cross-modulation compensation circuitry includes bias control circuitry coupled to the cross-modulation detection circuitry and to the bias input of the laser, the bias control circuitry being configured to vary the bias current provided to the laser in response to the filtered cross-modulation detection signal such that the varying bias current imparts a compensating cross-modulation to the RF signal compensating for the cross-modulation component at the target frequency range.

3. The system of claim 1 wherein the cross-modulation compensation circuitry includes a modulator configured to control attenuation and/or gain of the multichannel RF signal responsive to the filtered cross-modulation detection signal such that compensating cross-modulation is imparted to the multichannel RF signal to compensate for the cross-modulation component at the target frequency range.

4. The system of claim 1 wherein the target frequency range is about 15.75 kHz.

5. The system of claim 1 wherein the RF signal is a CATV signal, and wherein the target frequency range is the frequency corresponding to a horizontal line frequency of video signals in the CATV signal.

6. The system of claim 1 wherein the cross-modulation detection circuitry includes envelope follower circuitry configured to receive the multichannel RF signal, to detect an envelope of the multichannel RF signal and to generate a cross-modulation detection signal that follows at least a portion of the envelope of the multichannel RF signal.

7. The system of claim 1 wherein the cross-modulation detection circuitry includes RF power detector circuitry configured to receive the multichannel RF signal, to detect RF power fluctuations and to generate a cross-modulation detection signal responsive to the detected RF power fluctuations.

8. The system of claim 1 further comprising at least one magnitude control element configured to adjust the magnitude of the cross-modulation detection signal.

9. The system of claim 1 further comprising at least one phase control element configured to adjust the phase of the cross-modulation detection signal.

10. The system of claim 1 further comprising anti-clipping circuitry configured to receive the multichannel RF signal and to generate an anti-clipping signal in response to the multichannel RF signal, and wherein the anti-clipping circuitry is configured to vary a bias current to the laser in response to the anti-clipping signal such that at least one negative voltage spike in the RF signal is prevented from causing clipping in the laser.

11. The system of claim 10 wherein the anti-clipping circuitry comprises peak detection circuitry.

12. The system of claim 1 wherein the multichannel RF input signal occupies a bandwidth over a frequency range of about 50 MHz to 1000 MHz.

13. The system of claim 1 wherein the multichannel RF signal includes a CATV signal including a plurality of video channels.

14. A method of reducing cross-modulation in a modulated optical system, the method comprising:

providing a multichannel RF signal to a laser diode, the multichannel RF signal including a superposition of multiple carriers, and wherein at least one of the multiple carriers modulates at least one other of the multiple carriers resulting in cross-modulation;

receiving a portion of the RF signal on at least one secondary signal path;

generating a cross-modulation detection signal responsive to the multichannel RF signal on the secondary signal path;

filtering the cross-modulation detection signal to generate a filtered cross-modulation detection signal at a target frequency range of about 15.75 kHz at which a cross-modulation component occurs;

modulating the multichannel RF signal provided to the laser in response to the filtered cross-modulation detection signal such that compensating cross-modulation is imparted to the multichannel RF signal to compensate for the cross-modulation component at the target frequency range; and providing a modulated optical signal from the laser.

15. The method of claim 14 wherein generating a cross-modulation detection signal comprises detecting an envelope of the multichannel RF signal such that the cross-modulation detection signal follows at least a portion of the envelope of the multichannel RF signal.

16. The method of claim 14 wherein generating a cross-modulation detection signal comprises detecting RF power fluctuations such that the cross-modulation detection signal varies with the detected RF power fluctuations.

17. The method of claim 14 further comprising:

generating an anti-clipping signal responsive to the multichannel RF signal on the secondary signal path; and varying the bias current provided to the laser diode in response to the anti-clipping signal such that at least one negative voltage spike in the RF signal is prevented from causing clipping in the laser.

18. The method of claim 14 wherein modulating the multichannel RF signal comprises varying a bias current provided to the laser in response to the filtered cross-modulation detection signal such that the varying bias current imparts a compensating cross-modulation to the RF signal compensating for the cross-modulation component at the target frequency range.

19. The method of claim 14 wherein modulating the multichannel RF signal comprises controlling attenuation and/or gain of the multichannel RF signal responsive to the filtered cross-modulation detection signal such that compensating cross-modulation is imparted to the multichannel RF signal to substantially compensate for the cross-modulation component at the target frequency range.

20. The method of claim 14 wherein the RF signal is a CATV signal, and wherein the target frequency range is the frequency corresponding to a horizontal line frequency of video signals in the CATV signal.

21. The method of claim 14 wherein the multichannel RF signal occupies a bandwidth over a frequency range of about 50 MHz to 1000 MHz.

22. A modulated optical system with cross-modulation compensation, the system comprising:
- a laser including a RF input configured to receive a multichannel RF signal, a bias input configured to receive a bias current, and an optical output configured to provide a modulated optical signal in response to the multichannel RF signal and the bias current, the multichannel RF signal including a superposition of multiple carriers, and wherein at least one of the multiple carriers modulates at least one other of the multiple carriers resulting in cross-modulation;
- cross-modulation detection circuitry configured to receive the multichannel RF signal and to generate a cross-modulation detection signal responsive to the multichannel RF signal, the cross-modulation detection circuitry comprising a filter configured to filter the cross-modulation detection signal and to generate a filtered cross-modulation detection signal at a target frequency range at which a cross-modulation component occurs, wherein the RF signal is a CATV signal, and wherein the target frequency range is the frequency corresponding to a horizontal line frequency of video signals in the CATV signal; and
- cross-modulation compensation circuitry configured to modulate the multichannel RF signal provided to the laser in response to the filtered cross-modulation compensation signal such that compensating cross-modulation is imparted to the multichannel RF signal to compensate for the cross-modulation component at the target frequency range.

23. A modulated optical system with cross-modulation compensation, the system comprising:
- a laser including a RF input configured to receive a multichannel RF signal, a bias input configured to receive a bias current, and an optical output configured to provide a modulated optical signal in response to the multichannel RF signal and the bias current, the multichannel RF signal including a superposition of multiple carriers, and wherein at least one of the multiple carriers modulates at least one other of the multiple carriers resulting in cross-modulation;
- cross-modulation detection circuitry configured to receive the multichannel RF signal and to generate a cross-modulation detection signal responsive to the multichannel RF signal, the cross-modulation detection circuitry comprising a filter configured to filter the cross-modulation detection signal and to generate a filtered cross-modulation detection signal at a target frequency range at which a cross-modulation component occurs;
- at least one phase control element configured to adjust the phase of the cross-modulation detection signal; and
- cross-modulation compensation circuitry configured to modulate the multichannel RF signal provided to the laser in response to the filtered cross-modulation compensation signal such that compensating cross-modulation is imparted to the multichannel RF signal to compensate for the cross-modulation component at the target frequency range.

\* \* \* \* \*